(12) United States Patent
Ito (10) Patent No.: US 6,379,224 B1
(45) Date of Patent: Apr. 30, 2002

(54) METHOD OF RECOVERING OPTICAL DISK SUBSTRATE AND OPTICAL DISK SUBSTRATE RECOVERING APPARATUS

(76) Inventor: Tomoaki Ito, 4-2-3-104, Shiginonishi, Jotoku, Osakashi, Osaka 536-0014 (JP)

( * ) Notice: Subject to any disclaimer, the term of this patent is extended or adjusted under 35 U.S.C. 154(b) by 0 days.

(21) Appl. No.: 09/540,868

(22) Filed: Mar. 31, 2000

(30) Foreign Application Priority Data

Mar. 31, 1999 (JP) .......................................... 11-092299

(51) Int. Cl.⁷ ................................................. B24B 7/30
(52) U.S. Cl. ........................... 451/41; 451/285; 451/63
(58) Field of Search .............................. 451/41, 63, 285

(56) References Cited

U.S. PATENT DOCUMENTS

| | | | | |
|---|---|---|---|---|
| 5,220,754 A | * | 6/1993 | Tayebi et al. .................. | 451/59 |
| 5,445,555 A | * | 8/1995 | Tokura et al. ................. | 451/28 |
| 6,069,080 A | * | 5/2000 | James et al. ................. | 438/691 |

FOREIGN PATENT DOCUMENTS

| | | |
|---|---|---|
| DE | 43 40 595 A1 | 6/1995 |
| JP | 5-166231 | 2/1993 |
| JP | 5-210873 | 8/1993 |
| JP | 9-97432 | 4/1997 |
| JP | 0184819 | * 7/1997 ........... G11B/23/50 |
| JP | 10-214424 | 8/1998 |

\* cited by examiner

Primary Examiner—Derris H. Banks
Assistant Examiner—David B. Thomas
(74) Attorney, Agent, or Firm—Armstrong, Westerman, Hattori, McLeland, & Naughton, LLP (57) ABSTRACT

An optical disk substrate recovering apparatus A includes an optical disk storing portion 10, an abrader 20 for abrading a reflecting layer and a recording layer of the optical disk D, a powder collecting device 30 for collecting powdered reflecting materials and recording materials, and an optical disk transferring device 40 for transferring the optical disk D from the optical disk storing portion 10 to the abrader 20 one by one and for transferring the abraded disk substrate 1 to the abraded disk substrate storing portion 50. The devices 20, 30, 40 are sequentially operated to thereby obtain a pure and transparent abraded disk substrate 1 made of synthetic resin from which the reflecting layer and the recording layer are removed.

14 Claims, 5 Drawing Sheets

METHOD OF RECOVERING OPTICAL DISK SUBSTRATE AND OPTICAL DISK SUBSTRATE RECOVERING APPARATUS

BACKGROUND OF THE INVENTION

1. Field of the Invention

This invention relates to a method of recovering an optical disk substrate and an optical disk substrate recovering apparatus. More particularly, it relates to a method of recovering an optical disk substrate from an optical disk including a write-once optical disk called "CD-R", a read only disk called "CD-ROM" and an optical magnetic disk, and also relates to an optical disk substrate recovering apparatus for recovering the optical disk substrate from the optical disk.

2. Description of Related Art

Recently, a write-once optical disk called "CD-R" is getting widely used for developing computer programs or recording account data in secret. For example, in a company developing computer programs, several hundreds of CD-Rs are used in one day.

However, since the majority of such CD-Rs include uncompleted programs or wrong data, they are to be disposed. Such a disk to be disposed may include confidential matter or data. Therefore, it is required to destroy the recorded data before disposing the disk so as not to leak out the confidential matter or data.

Japanese Unexamined Laid-open Patent Publication No. 09-097432 A (hereinafter referred to as "JP' 432) discloses a method of destroying the data of the optical disk. In the method, a coating material is applied on the recording surface of the optical disk, or a high power radiation is irradiated onto the disk.

Japanese Unexamined Laid-open Patent Publication No. 10-214424 A (hereinafter referred to as "JP' 424) discloses a method of making impossible to read the recorded data. In the method, the heat of 80° C. to 150° C. is applied to an optical disk to cause a thermal change around the periphery of the data pits.

Japanese Unexamined Laid-open Patent Publication No. 05-166231 A (hereinafter referred to as "JP' 231) discloses a method of making impossible to read the recorded data. In this method, taking into account of the poor adhesion of the reflection layer to the light absorption layer, an adhesive tape is adhered to the surface of the protective layer on the reflection layer and the upward force is applied thereto, by which the light absorption layer and the reflection layer are separated at the boundary thereof.

Furthermore, Japanese Unexamined Laid-open Patent Publication No. 05-210873 A (hereinafter referred to as "JP' 873) discloses a method of making impossible to read the recorded data. In this method, the recording layer is polished while supplying water thereto with a polisher consisting of a cylindrical polishing sheet manufactured by mixing grinding grains and an adhesive to a supporting material and molding the mixture by hot pressing.

However, according to the methods disclosed in JP' 432 and JP' 424, the disk with destroyed data still includes metallic films constituting the light absorption layer and the reflection layer made of aluminum and/or gold on the transparent disk substrate made of transparent synthetic resin. Therefore, disposing the disk as it is has problems in environmental safeguard because the plastic materials and the metallic materials are not separated. Furthermore, in order to re-use these optical disks, it is required to separate the optical disk into the synthetic materials of the disk substrate and the metallic materials of the reflection layer.

According to the method of JP' 231, although the optical absorption layer as a recording layer and the reflection layer are separated with each other, the optical absorption layer is not separated from the disk substrate. Therefore, in order to recycle the synthetic resin disk substrate, It is required to remove the optical absorption layer from the disk substrate. Although the removal of the optical absorption layer from the disk substrate may not be technically difficult, the work is inefficient because the aforementioned removal of the optical absorption layer is performed in addition to the removal of the reflection layer.

According to the method of JP' 873, since the polishing of the optical disk is performed while supplying water thereto, it is troublesome to treat the wasted water including the powder generated by polishing the optical disk as well as to extract noble metals which may be included in the reflection layer. Furthermore, it is required to protect the electric parts of the apparatus from water, which complicates the manufacturing of the apparatus.

SUMMARY OF THE INVENTION

The present invention is made in view of the aforementioned technical drawbacks.

It is an object of the present invention to provide a method of recovering an optical disk substrate from an optical disk and an optical disk substrate recovering apparatus, by which the data of the optical disk can be destroyed, the disk substrate can be recovered by removing the recording layer and the reflecting layer from the optical disk, and the powdered recording materials and reflecting materials can be easily treated.

According to one aspect of the present invention, a method of recovering an optical disk substrate from an optical disk having a recording layer and a reflecting layer laminated on the optical disk substrate made of synthetic resin by removing the reflecting layer and the recording layer included the steps of: abrading the reflecting layer and the recording layer of the optical disk into powdered reflecting materials and recording materials without supplying water to obtain an abraded disk substrate while collecting the powdered reflecting materials and recording materials, and collecting the abraded disk substrate.

With this method of recovering an optical disk substrate from an optical disk, the recording layer and the reflecting layer can be assuredly removed from the optical disk substrate made of synthetic resin to thereby recover the synthetic resin disk substrate to which no material constituting the recording layer and the reflecting layer is adhered. In addition, the abrasion of the optical disk is performed without supplying water thereto while collecting the powdered recording materials and reflecting materials, which enables an easy treatment of the powdered recording materials and reflecting materials.

Another aspect of the present invention resides in an optical disk substrate recovering apparatus for recovering an optical disk substrate from an optical disk having a recording layer and a reflecting layer laminated on the optical disk substrate made of synthetic resin by removing the reflecting layer and the recording layer. The apparatus includes an optical disk storing portion for storing a plurality of the optical disks, an abrader for abrading the reflecting layer and the recording layer of the optical disk into powdered reflecting materials and recording materials to obtain an abraded disk substrate, an optical disk transferring device for transferring the optical disk from the optical disk storing portion to the abrader one by one, a powder collecting device for collecting the powdered reflecting materials and recording materials, an abraded disk substrate storing portion for storing the abraded disk substrate, and an abraded disk substrate transferring device for transferring the abraded disk substrate to the abraded disk substrate storing portion.

With this apparatus, the recording layer and the reflecting layer can be assuredly removed from the optical disk substrate made of synthetic resin to thereby recover the synthetic resin disk substrate to which no material constituting the recording layer and the reflecting layer is adhered. In addition, by operating the apparatus after storing a plurality of optical disks into the optical disk storing portion, the optical disk substrates can be recovered automatically. Furthermore, by discharging the powdered reflecting materials and recording materials out of the apparatus, harmful influences to the motor due to the powdered materials can be prevented, resulting in a trouble-free operation of the apparatus.

It is preferable to absorb the powdered reflecting materials and recording materials by means of a vacuum pump, which causes air turbulence to thereby prevent a temperature rise of the disk substrate due to the friction heat generated during the abrasion of the optical disk.

It is preferable to agitate ambient air around the optical disk, which enhances the collection of the powdered reflecting materials and recording materials by the vacuum pump.

The optical disk transferring device and the abraded disk substrate transferring device may be independent devices or a common device. In a case where the optical disk transferring device and the abraded disk substrate transferring device are independent devices, the time required to recover the optical disk can be shortened. On the other hand, in a case where the optical disk transferring device and the abraded disk substrate transferring device are a common device, the structure can be simplified.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENT

An optical disk substrate recovering apparatus according to the preferred embodiment of the present invention will be explained with reference to the drawings.

Since the method of recovering an optical disk substrate from an optical disk will be apparent from the explanation of the optical disk substrate recovering apparatus, the following explanation will be directed to the optical disk substrate recovering apparatus.

Figure 1:
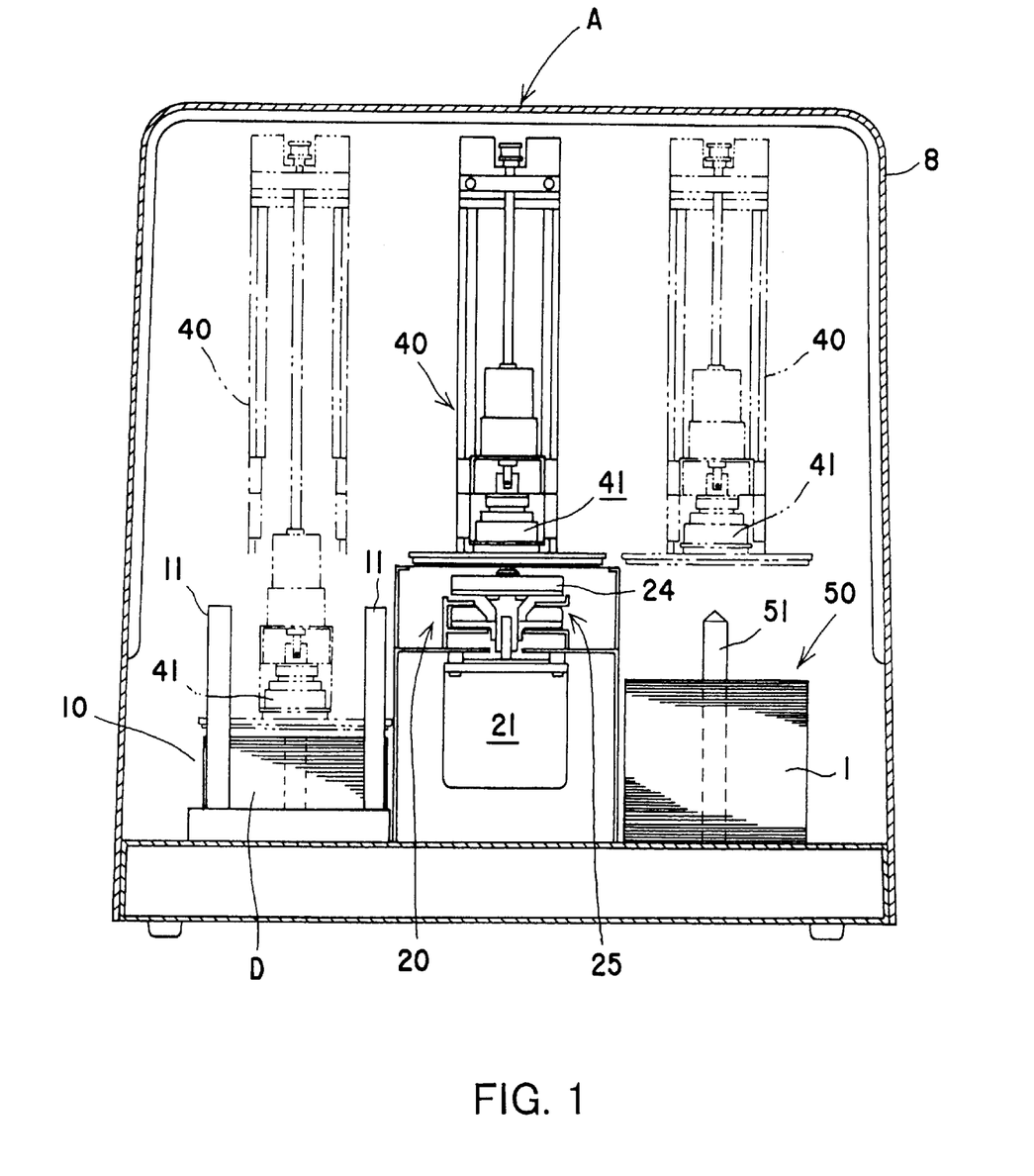
FIG. 1 is a front view showing an optical disk substrate recovering apparatus according to an embodiment of the present invention.
Figure 2:
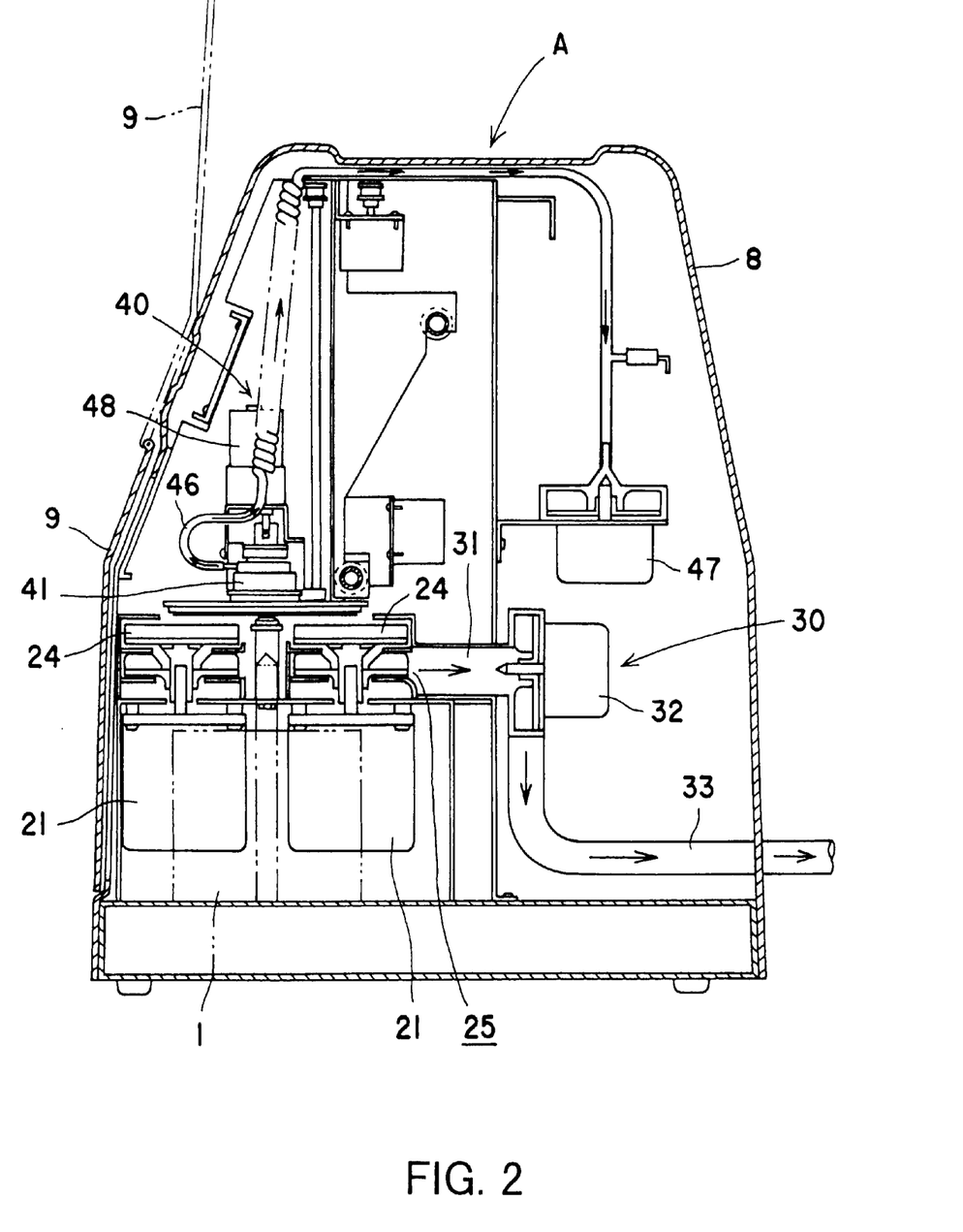
FIG. 2 is a side view of the optical disk substrate recovering apparatus.

FIGS. 1 and 2 show a schematic view of the optical disk substrate recovering apparatus A.

The optical disk substrate recovering apparatus A is provided with an outer casing B having a size corresponding to a size of a microwave oven for household use. Provided in the outer casing 8 are an optical disk storing portion 10 for storing a plurality of optical disks D, an abrader 20 for abrading the recording layer 2 and the reflecting layer 3 of the optical disk D and an abraded disk substrate storing portion 50 for storing the abraded disk substrates 1. In the front wall of the outer casing 8, a lid 9 which opens upwardly is provided. By opening the lid 9, optical disks D can be stored in the optical disk storing portion 10 and the abraded disk substrates 1 can be taken out from the abraded disk substrate storing portion 50.

Figure 4A:
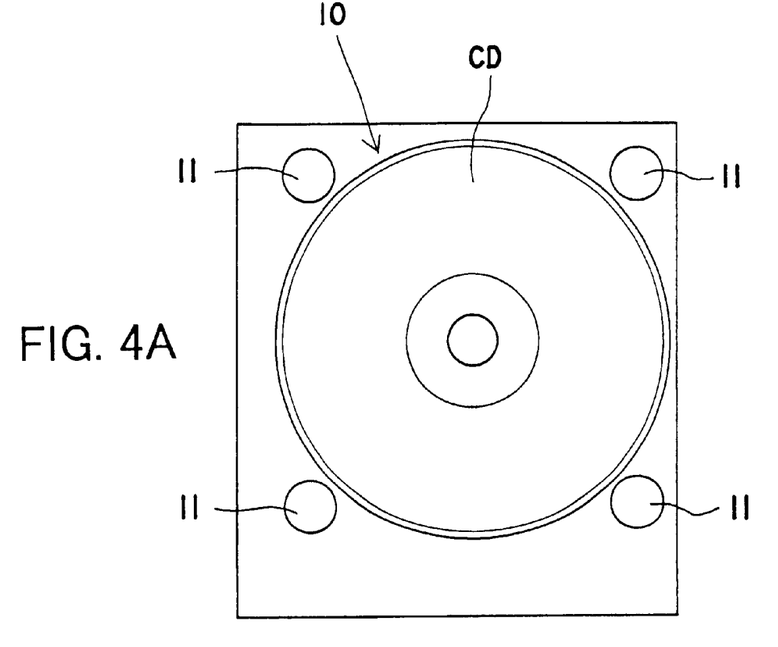
FIG. 4A is a schematic plan view showing an optical disk storing portion.
Figure 4B:
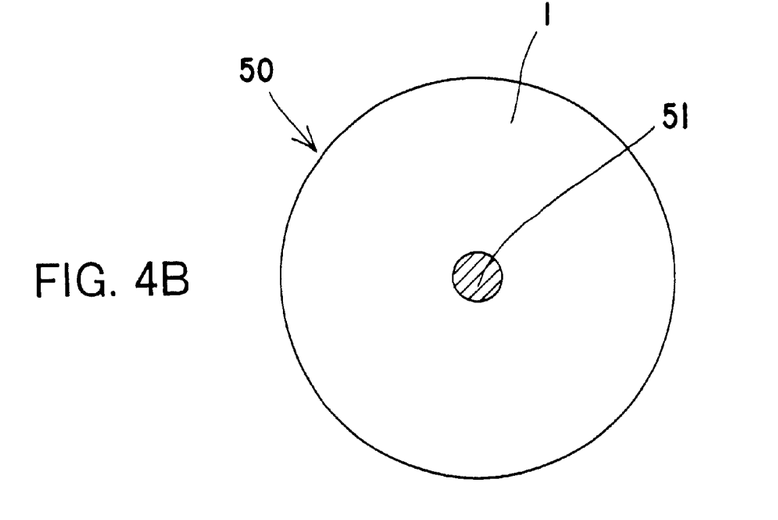
FIG. 4B is a schematic plan view showing an abraded disk substrate storing portion.
Figure 5:
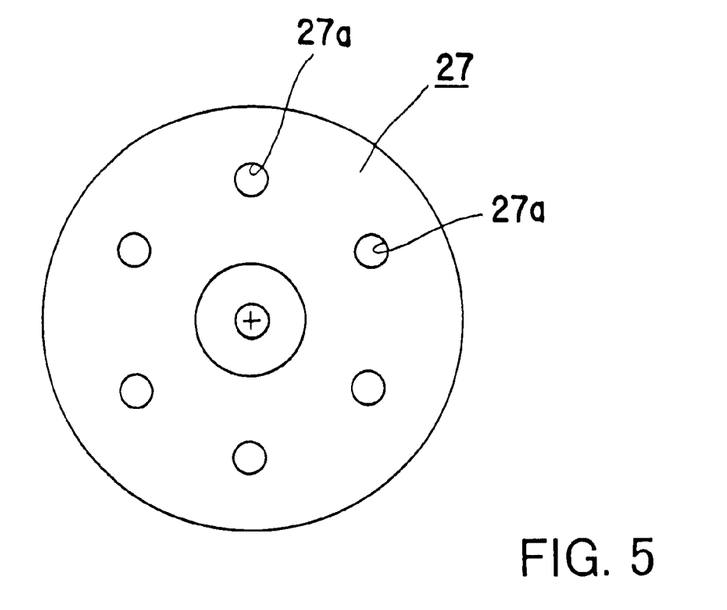
FIG. 5 is a bottom view showing a holding plate of the abrader.
Figure 6A:
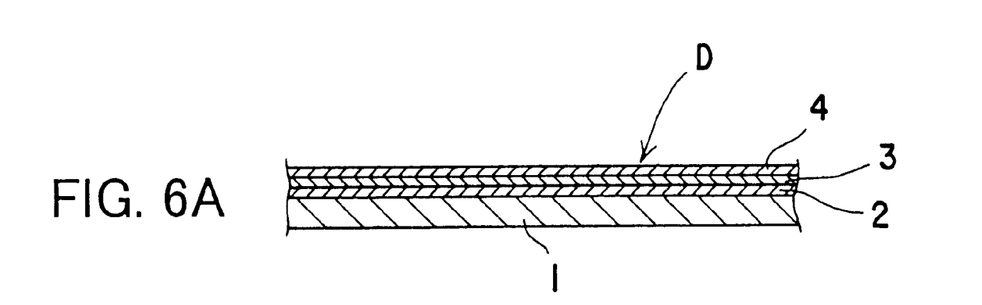
FIG. 6A is an enlarged cross-sectional view showing the optical disk.
Figure 6B:
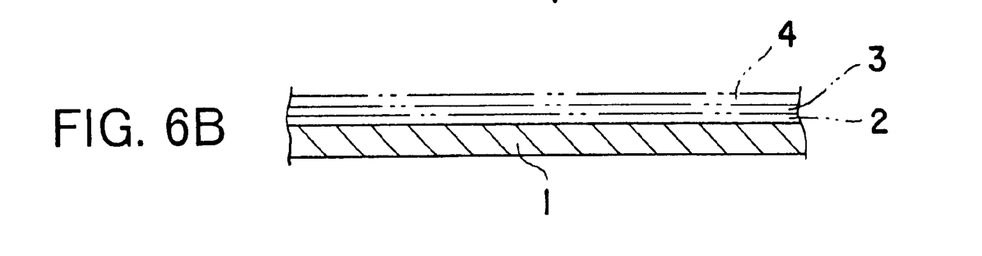
FIG. 6B is an enlarged cross-sectional view showing the abraded disk substrate.

As shown in FIG. 4A, the optical disk storing portion 10 is provided with positioning poles 11 at equal intervals so as to touch the outer peripheral edge of the optical disk D, whereby a plurality of optical disks D can be orderly stacked. This allows a descending movement of a disk holder 41 provided to a transferring device 40 which will be detailed later. In the optical disk storing portion 10, the optical disk D should be stored with the disk substrate 1 facing upward. In other words, the optical disk D should be stored with the recording layer 2 and the reflecting layer 3 facing downward.

As shown, in FIG. 1, the abraded disk substrate storing portion 50 is provided with a holding pole 51 for holding the abraded disk substrate 1 with the holding pole 51 inserted in the central hole of the abraded disk substrate 1. The abraded disk substrate 1 from which the recording layer 2 and the reflecting layer 3 are removed by the abrader 20 is transferred, and then dropped from above the holding pole 51. As a result, the abraded disk substrate 1 is stored in the abraded disk substrate storing portion 50 with the holding pole 51 inserted in the central hole of the abraded disk substrate 1. For easy insertion of the holding pole 51 into the central hole of the abraded disk substrate 1, the upper end portion of the holding pole 51 is formed to have a cone shape.

Figure 3:
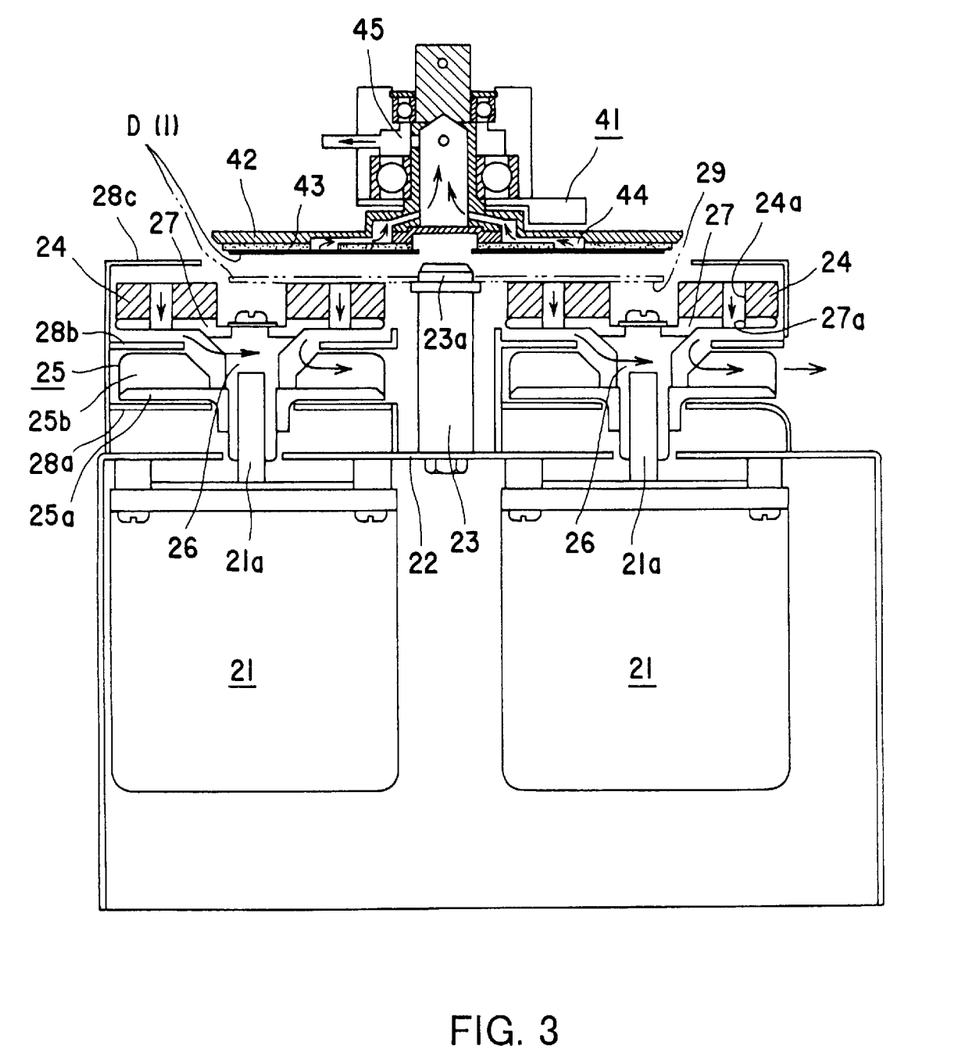
FIG. 3 is a side cross-sectional view showing the abrader and a part of the disk holder.

As shown in FIGS. 2 and 3, the abrader 20 is provided with a pair of driving motors 21 and a pair of abrading members 24 each driven by the respective motor 21. Each driving motor 21 is suspended from a holding plate 22 with the rotation shaft 21a of the motor 21 upwardly protruded through the holding plate 22.

At the center-portion of the holding plate 22, a supporting rod 23 having a hub 23a to be fitted in the central hole of the optical disk D is upwardly protruded. The position where the hub 23a is engaged with the central hole of the optical disk D is an abrading position 29.

The rotation shaft 21a of the driving motor 21 is provided with the abrading member 24 of a plate shape and an agitating rotational plate 25 by way of a fixing sleeve 26. As shown in FIG. 3, the abrading member 24 is detachably attached to a circular holding plate 27 integrally fixed to the upper portion of the fixing sleeve 26. The abrading member 24 and the circular holding plate 27 are provided with a plurality of penetrated apertures 24a, 27a so as to correspond with each other, so that the powdered materials generated by abrading the optical disk D can be downwardly introduced into the apertures 24a, 27a. The agitating rotational plate 25 provided below the circular holding plate 27 is equipped with a base plate 25a and a plurality of wings 25b upwardly protruded from the upper surface of the base plate 25a. These wings 25b agitate air above the agitating rotational plate 25 in accordance with the rotation of the driving motor 21, so that the powdered materials downwardly passed through the penetrated apertures 24a, 27a of the abrading member 24 and the circular holding plate 27 is introduced toward the hollow portion 31 to enhance the collection of the powdered materials by the collecting device 30, as shown in FIG. 2. Furthermore, as shown in FIG. 3, above and below the agitating rotational plate 25, powder prevention walls 28b, 28a for preventing the powder materials generated from the optical disk D are provided. In addition, a powder prevention wall 28c is also provided so as to be located above the level of the abrading position 29 and to surround the periphery of the optical disk D placed at the abrading position 29.

The collecting device 30 includes, as shown in FIG. 2, the hollow portion 31 formed beside the agitating rotational plate 25, a vacuum pump 32 placed at the end of the hollow portion 31 and an exhaust pipe 33 for exhausting the powdered materials out of the outer casing 8. The exhaust pipe 33 is introduced into a powder collecting case (not shown) located outside the outer casing 8.

The transferring device 40 is used to transfer the optical disk D from the optical disk storing portion 10 to the abrading position 29 and also used to transfer the abraded disk substrate 1 from the abrading position 29 to the abraded disk substrate storing portion 50. The transferring device 40 is provided with the disk holder 41 for holding the optical disk D/the abraded disk substrate 1, and transfers the disk D/the substrate 1 by shifting rightward, leftward, upward or downward.

As shown in FIG. 3, the disk holder 41 includes a holder plate 42 and a rubber plate 43 adhered on the lower surface of the holder plate 42. The rubber plate 43 is to be fitted to the optical disk substrate 1. Both the holder plate 42 and the rubber plate 43 are provided with air passages 44. The disk holder 41 is also provided with an air passage 45 communicated with the air passages 44. As shown in FIG. 2, the air passage 45 is connected to an end of a sucking pipe 46. The other end of the sucking pipe 46 is connected to the vacuum pump 47. Therefore, the operation of the vacuum pump 47 allows the optical disk D and the disk substrate 1 to be absorbed to the rubber plate 43 before or after the abrasion. The disk holder 41 is rotated in a horizontal plane by a geared motor 48 at a reduced rotational rate. The disk holder 41 is positioned above either the optical disk storing portion 10 or the abraded disk substrate storing portion 50 before the operation of the optical disk substrate recording apparatus A.

Next, the operation of the aforementioned optical disk substrate recording apparatus A will be explained.

First, a plurality of optical disks D from which disk substrates 1 are to be recovered are stored in the optical disk storing portion 10 via an opening made by opening the lid 9. By throwing the optical disks D with the disk substrate 1 facing upward into a space defined by the positioning poles 11, these disks D will be piled up orderly.

Then, the lid 9 is closed and the switch (not shown) is turned on to start to operate the apparatus A, causing a descending of the disk holder 41 located above the optical disk storing portion 10, which results in an abutment of the rubber plate 43 on the upper most optical disk D. Before or at the same time of the abutment, the pump 47 of the transferring device 40 starts to operate, whereby the uppermost optical disk D is absorbed by the disk holder 41. When the optical disk D is assuredly absorbed by the disk holder 41, the disk holder 41 moves so as to be located above the abrader 20. Accordingly, the optical disk D is also transferred so as to be located above the abrader 20, as shown in FIGS. 1 and 2. Then, from this height, the disk holder 41 slowly descends, so that the hub 23a of the supporting rod 23 is fitted in the central hole of the optical disk D. This results in a slight pressing of the optical disk D onto the abrading member 24. Then, the abrading members 24 start to rotate by the respective driving motor 21 of the abrader 20. As a result, the protecting layer 4, the reflecting layer 3 and the recording layer 2 of the optical disk D are abraded in this order. Thus, the materials constituting each layer is removed in a powdered state.

The powdered materials generated by the abrasion and fell down through the penetrated apertures 24a, 27a are agitated by the agitating rotational plate 25, and absorbed by the collecting device 30. Then, the powdered materials will be gathered in a powder collecting case (not shown) located outside the outer casing 8. In the case of CD-R, since the collected powdered materials include gold constituting the reflecting layer, the gold can be easily recovered by subjecting to an appropriate treatment.

After the completion of the predetermined depth abrasion, the disk holder 41 ascends while holding the abraded disk substrate 1 so as to detach the central hole of the abraded disk substrate 1 from the hub 23a of the supporting rod 23. As shown in FIG. 3, it is enough to ascend the abraded disk substrate 1 to the height slightly above the powder prevention wall 28c.

Then, while holding the abraded disk substrate 1, the disk holder 41 horizontally moves to the position above the abraded disk substrate storing portion 50 so that the center hole of the abraded disk substrate 1 is located just above the holding pole 51. Then, the disk holder 41 starts to descend, and stops when the center hole of the abraded disk substrate 1 approaches the upper end of the holding pole 51. When the disk holder 41 stops to descend, the pump 47 also stops to operate, resulting in a termination of absorbing the abraded disk substrate 1 by the disk holder 41. Accordingly, the abraded disk substrate 1 is detached from the disk holder 41 and falls down. Thus, the abraded disk substrate 1 is stored in the abraded disk substrate storing portion 50 with its central hole penetrated by the holding pole 51.

Thus, the sequence of the operations by which one disk substrate 1 is recovered from an optical disk D is completed.

After the completion of the recovery of the disk substrate 1 from an optical disk D, the disk holder 41 ascends up to the position where the disk holder 41 can move horizontally, and then moves horizontally toward the position above the optical disk storing portion 10. After the disk holder 40 arrived at the position above the optical disk storing portion 10, the aforementioned sequence of the operations will be repeated until the lowermost optical disk D is processed.

As mentioned above, according to the method of recovering an optical disk substrate from an optical disk, the reflecting layer 3 and the recording layer 2 of the optical disk D are abraded into powdered reflecting materials and recording materials, the destruction of the data and recovery of the pure disk substrate 1 can be performed at a time. Thus, the leakage of the secret data recorded in an unnecessary optical disk D can be assuredly prevented. Furthermore, the recycling of the disk substrate 1 can be easily performed.

In addition, since the abrasion of the optical disk D is performed without supplying water, the treatment of the powdered materials generated by abrading the optical disk D can be easily performed. Furthermore, an optical disk substrate recovering apparatus A is not required to provide any special waterproofing, resulting in a reduction of the manufacturing cost.

Furthermore, since the powdered materials are collected, the treatment of the powdered materials can be performed easily.

In a case where a vacuum pump 32 is used as a collecting device 30, since the pump 32 causes air turbulence by absorbing air around the abrading portion, the temperature rise due to the friction heat caused by the abrasion is reduced, resulting in a prevention of the melt of the disk substrate 1 to be recovered.

In a case where the abrasion of the optical disk D is performed while agitating air around the abrasion position, the collection and absorption of the powdered materials can be effectively performed. This agitation also reduces the temperature rise due to the friction heat caused by the abrasion.

According to the optical disk substrate recovering apparatus of the present invention, since the recovering of the disk substrates 1, from a plurality of optical disks D can be continuously performed, the data can be assuredly destroyed, and the recycling of the disk substrate 1 can be easily performed.

Since the optical disk substrate recovering apparatus A is provided with a powder collection device 30 for collecting the powdered materials constituting the abraded recording layer 2 and the reflecting layer 3, the possible influence of the powdered materials to the driving motor 21 during the operation of the apparatus A can be decreased, resulting in a smooth operation. In addition, the recovering of noble metals such as gold constituting the reflecting layer 3 can be easily performed.

In a case where the optical disk transferring device 40 for transferring the optical disk D from the optical disk storing portion 10 to the abrader 29 and the abraded disk substrate transferring device 40 for transferring the abraded disk substrate 1 to the abraded disk substrate storing portion 50 are a common transferring device, the structure of the optical disk substrate recovering apparatus A can be simplified.

The present invention claims a priority based on Japanese Patent Application No. 11-92299 filed on Mar. 31, 1999, the content of which is incorporated hereinto by reference in its entirety.

The terms and descriptions in this specification are used only for explanatory purposes and the present invention is not limited to these, but many modifications and substitutions may be made without departing from the spirit of the scope of the present invention which is defined by the appended claims.

What is claimed is:

1. A method of recovering an optical disk substrate from an optical disk having a recording layer and a reflecting layer laminated on the optical disk substrate made of synthetic resin by removing the reflecting layer and the recording layer, the method including the steps of:

abrading the reflecting layer and the recording layer of the optical disk into powdered reflecting materials and recording materials without supplying water to obtain an abraded disk substrate while collecting the powdered reflecting materials and recording materials; and collecting the abraded disk substrate;

wherein said abrading is carried out by rotating said optical disk and pressing it against at least one rotating abrading member.

2. The method of recovering an optical disk substrate as recited in claim 1, wherein the abrading of the reflecting layer and the recording layer is performed while absorbing the powdered reflecting materials and recording materials by means of a vacuum pump.

3. The method of recovering an optical disk substrate as recited in claim 1, wherein the collecting of the powdered reflecting materials and recording materials is performed while agitating ambient air around the optical disk.

4. A method of recovering an optical disk substrate from an optical disk having a recording layer and a reflecting layer laminated on the optical disk substrate made of synthetic resin by removing the reflecting layer and the recording layer, the method including the steps of:

storing a plurality of the optical disks in an optical disk storing portion in a stacked manner;

transferring the optical disks stored in the optical disk storing portion to an abrader one by one;

abrading the reflecting layer and the recording layer of the transferred optical disk into powdered reflecting materials and recording materials without supplying water to obtain an abraded disk substrate while collecting the powdered reflecting materials and recording materials; and transferring the abraded disk substrate to an abraded disk substrate storing portion to store the transferred abraded disk substrate in a stacked manner, wherein the sequence of the aforementioned steps are automatically repeated, and said abrading is carried out by rotating said optical disk and pressing it against said abrader.

5. The method of recovering an optical disk substrate as recited in claim 4, wherein the transferring of the optical disk stored in the optical disk storing portion to the abrader and the transferring of the abraded disk substrate to the abraded disk substrate storing portion are performed by a common transferring device.

6. The method of recovering an optical disk substrate as recited in claim 4, wherein a sequence of the steps from the transferring of the optical disk stored in the optical disk storing portion to the abrader to the transferring of the abraded disk substrate to the abraded disk substrate storing portion, is performed while holding the optical disk or the abraded disk substrate by a holder by sucking the optical disk or the abraded disk substrate.

7. The method of recovering an optical disk substrate as recited in claim 4, wherein the abrading of the reflecting layer and the recording layer is performed while absorbing the powdered reflecting materials and recording materials by means of a vacuum pump.

8. The method of recovering an optical disk substrate as recited in claim 4, wherein the collecting of the powdered reflecting materials and recording materials is performed while agitating ambient air around the optical disk.

9. An optical disk substrate recovering apparatus for recovering an optical disk substrate from an optical disk having a recording layer and a reflecting layer laminated on the optical disk substrate made of synthetic resin by removing the reflecting layer and the recording layer, the apparatus comprising:

an optical disk storing portion for storing a plurality of the optical disks;

an abrader for abrading the reflecting layer and the recording layer of the optical disk into powdered reflecting materials and recording materials to obtain an abraded disk substrate;

an optical disk transferring device for transferring the optical disks from said optical disk storing portion to said abrader one by one;

an optical disk rotating device for rotating said optical disk while carrying out said abrading;

a powder collecting device for collecting the powdered reflecting materials and recording materials;

an abraded disk substrate storing portion for storing the abraded disk substrate; and an abraded disk substrate transferring device for transferring the abraded disk substrate to said abraded disk substrate storing portion.

10. The optical disk substrate recovering apparatus as recited in claim 9, wherein said optical disk transferring device and said abraded disk substrate transferring device are a common transferring device.

11. The optical disk substrate recovering apparatus as recited in claim 10, wherein said common transferring device is equipped with a disk holder capable of holding the optical disk or the abraded disk substrate by sucking the optical disk or the abraded disk substrate.

12. The optical disk substrate recovering apparatus as recited in claim 9, wherein said optical disk transferring device, said abrader, said powder collecting device and said abraded disk substrate transferring device are sequentially operated, whereby a plurality of the optical disks stored in said optical disk storing portion are automatically transferred, abraded, and then stored one by one.

13. The optical disk substrate recovering apparatus as recited in claim 9, wherein said powder collecting device includes a vacuum pump.

14. The optical disk substrate recovering apparatus as recited in claim 9, further comprising an air agitating device for agitating powdered reflecting materials and recording materials.

* * * * *